W. M. WATSON.
Making Plow Irons.
No. 100,825. Patented March 15, 1870.
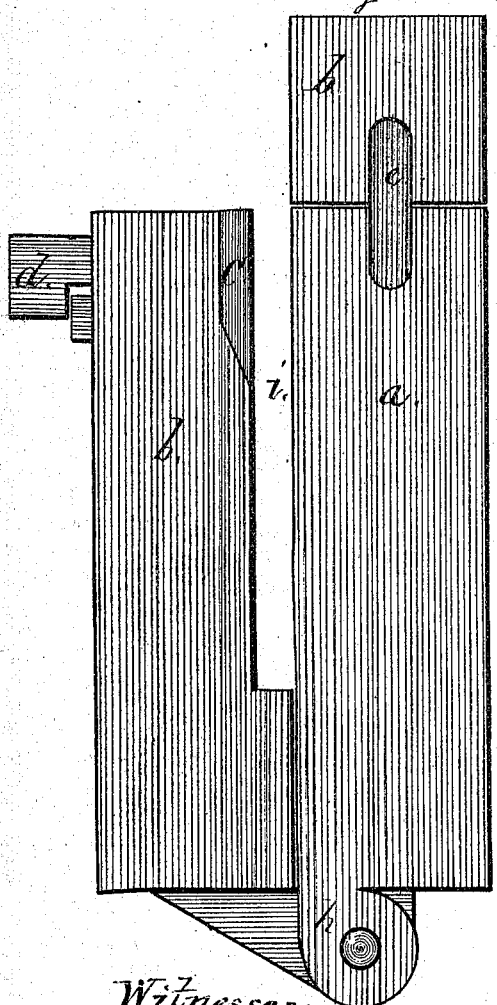
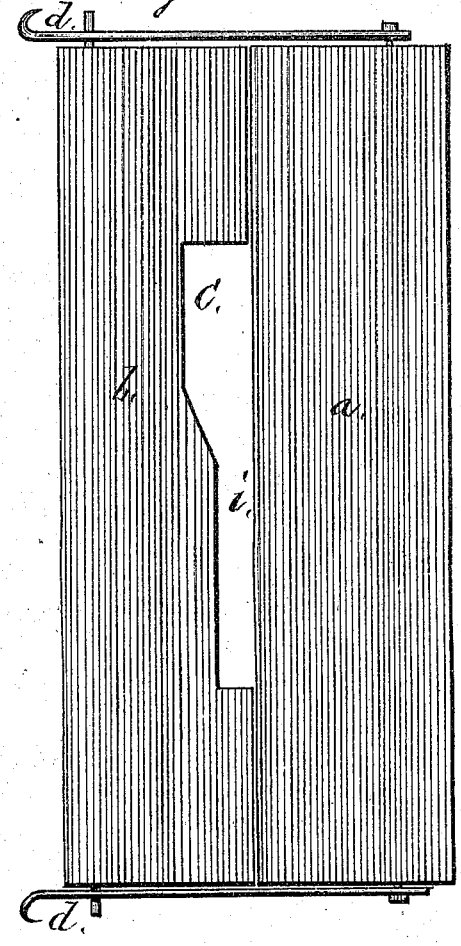
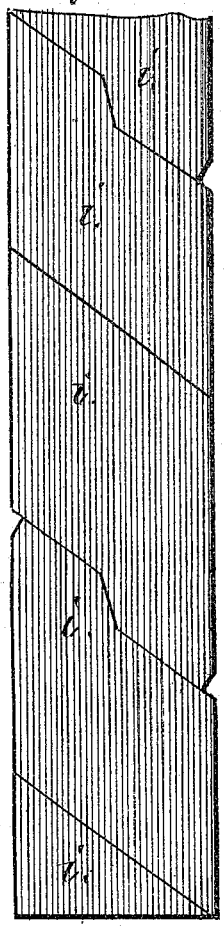
Witnesses:
A. J. West
Hubbell West
Inventor:
W. M. Watson

United States Patent Office.

W. M. WATSON, OF TONICA, ILLINOIS.

*Letters Patent No. 100,825, dated March 15, 1870.*

IMPROVED DIE OR FORMER FOR MAKING DOUBLE-SHINNED MOLD-BOARD BLANKS FOR PLOWS.

The Schedule referred to in these Letters Patent and making part of the same

*To all whom it may concern:*

Be it known that I, W. M. WATSON, of the town of Tonica, in the county of La Salle, and State of Illinois, have invented a new and useful Improved Mode of Making Mold-Board Blanks for Plows Double Shinned; and I do hereby declare that the following is a full and exact description thereof, reference being had so the accompanying drawings and to the letters of reference marked thereon.

The nature of my invention consists in providing a form, mold, or swage in which the shin of the mold-board blank can be upset, to any desired thickness.

The general way of making the shin of the mold-board double the thickness of the mold-board is to weld a strip of steel on the under side. The objection to it is, that it is impossible always to make the weld solid. There will be sometimes blisters in the center of the weld, and, when the mold-board is worn through to the weld, will prevent the plow from scouring and otherwise working well, and will last no longer than a single-shinned plow.

My object is to form the shin double, and know every time that it is solid.

To enable others skilled in the art to make and use my invention, I will proceed to describe its construction and operation.

The mold-board blank is cut out in any of the ordinary ways, and in any shape required; the only difference I make is in cutting the blank longer at the shin, to allow enough steel to upset it to the required thickness, as seen at fig. 2, *i i.*

Figure 1 is a sectional view cut through the center of the form.

Figure 2 is a top view of the same.

The form is made in two parts, *a* and *b*, and hung on a hinge, *h*, and fastened with clamps *d*, for the greater convenience of placing in and taking out the mold-board after it is formed in proper shape.

The front side of *a* is made plain, and that of *b* is made so as to form the double shin of any thickness and shape required, as shown by the shaded lines at *c*.

*a* is made to extend above *b*, as shown at *f*, either by being cast solid or put on with dowel-pins *e*, the object being to guide the steel while being upset, and prevent it from doubling over.

By using a form in two parts, when another pattern of plow is required, it is only necessary to take off one-half of the form and replace with the shape required, thus saving one-half the expense of forms.

I usually make the form of cast-iron, but it can be made of any suitable metal, and the form may be made in various ways, as will readily suggest itself to persons skilled in working in iron.

The mold-board blank is heated to a proper heat, placed in the form, put under a light trip-hammer, and upset until the proper thickness is obtained and the steel hammered solid in the form; a lever, screw, rolls, or hand-labor may be used, but a trip-hammer does the work the best.

What I claim as my invention, and desire to secure by Letters Patent, is—

The herein-described die or former, in which to upset and thicken the edge or shin of a mold-board blank, substantially as and for the purposes set forth.

W. M. WATSON.

Witnesses:
HENRY GUNN,
E. BALL.